(12) United States Patent
Xu et al.

(10) Patent No.: US 11,455,463 B2
(45) Date of Patent: Sep. 27, 2022

(54) FACILITATING USER INTERACTION IN ONLINE SPREADSHEETS

(71) Applicant: BEIJING BYTEDANCE NETWORK TECHNOLOGY CO., LTD., Beijing (CN)

(72) Inventors: Yu Xu, Beijing (CN); Hancheng Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/536,997

(22) Filed: Nov. 29, 2021

(65) Prior Publication Data

US 2022/0083729 A1    Mar. 17, 2022

Related U.S. Application Data

(63) Continuation of application No. PCT/CN2020/089843, filed on May 12, 2020.

(30) Foreign Application Priority Data

May 31, 2019 (CN) .......................... 201910472514.X

(51) Int. Cl.
*G06F 40/18* (2020.01)
*G06F 40/134* (2020.01)

(52) U.S. Cl.
CPC ............ *G06F 40/18* (2020.01); *G06F 40/134* (2020.01)

(58) Field of Classification Search
CPC ................................ G06F 40/18; G06F 40/134
See application file for complete search history.

(56) References Cited

U.S. PATENT DOCUMENTS 9,798,889 B1 * 10/2017 Karpel ................ G06F 21/6227
10,552,530 B1 * 2/2020 Karpel ................ H04L 63/102
(Continued)

FOREIGN PATENT DOCUMENTS

CN   106612226 A   5/2017
CN   109558575 A   4/2019
(Continued)

OTHER PUBLICATIONS

International Application No. PCT/CN2020/089843, International Search Report dated Aug. 10, 2020, 2 pages.
(Continued)

*Primary Examiner* — Asher D Kells
(74) *Attorney, Agent, or Firm* — Faegre Drinker Biddle & Reath LLP

(57) ABSTRACT

The present disclosure provides an interactive information notification method and apparatus, a device, and a computer-readable storage medium. The method includes receiving an interactive information viewing instruction sent by a first user, the viewing instruction including position information of the interactive information in an online spreadsheet; acquiring the interactive information from the online spreadsheet according to the position information; and displaying the interactive information in a highlighted manner in the online spreadsheet so that the interactive information is distinguished from other information in the online spreadsheet. Therefore, the user can quickly and intuitively determine the position of the interactive information and correspondingly process the interactive information, so that the user's editing efficiency for the online spreadsheet is improved.

14 Claims, 4 Drawing Sheets

(56) References Cited

U.S. PATENT DOCUMENTS

| | | | |
|---|---|---|---|
| 10,572,584 B1* | 2/2020 | Karpel | G06F 16/93 |
| 10,789,378 B1* | 9/2020 | Karpel | G06F 21/629 |
| 2003/0200504 A1* | 10/2003 | Atkinson | G06F 40/137 |
| | | | 715/209 |
| 2005/0198325 A1* | 9/2005 | Holland | G06F 40/197 |
| | | | 709/225 |
| 2012/0066574 A1 | 3/2012 | Lee et al. | |
| 2012/0151378 A1* | 6/2012 | Parish | G06Q 10/101 |
| | | | 715/751 |
| 2013/0097481 A1* | 4/2013 | Kotler | G06F 16/34 |
| | | | 715/230 |
| 2014/0082470 A1 | 3/2014 | Trebas et al. | |
| 2014/0157098 A1* | 6/2014 | Maresca | G06F 40/18 |
| | | | 715/219 |
| 2014/0281870 A1 | 9/2014 | Vogel et al. | |
| 2017/0329793 A1* | 11/2017 | Dolman | H04M 1/27457 |
| 2018/0121667 A1* | 5/2018 | Karpel | G06F 40/18 |
| 2018/0191805 A1* | 7/2018 | Hurwitz | H04L 67/26 |
| 2019/0138583 A1* | 5/2019 | Silk | G06F 40/197 |
| 2019/0138588 A1* | 5/2019 | Silk | G06F 16/23 |
| 2019/0138589 A1* | 5/2019 | Udell | G06F 40/18 |
| 2019/0370321 A1* | 12/2019 | Bisceglie | G06F 16/176 |
| 2020/0042584 A1* | 2/2020 | Vennix | G06F 40/103 |
| 2021/0319172 A1* | 10/2021 | Anderson | G06F 40/197 |

FOREIGN PATENT DOCUMENTS

| | | |
|---|---|---|
| CN | 109657220 A | 4/2019 |
| CN | 109710909 A | 5/2019 |
| CN | 109815200 A | 5/2019 |
| CN | 110213367 A | 9/2019 |

OTHER PUBLICATIONS

Chinese Patent Application No. 201910472514.X, First Office Action dated Apr. 22, 2021, 5 pages.

The Extended European Search Report dated May 20, 2022 in European Patent Application No. 20813545.9.

* cited by examiner

FACILITATING USER INTERACTION IN ONLINE SPREADSHEETS

CROSS REFERENCE TO RELATED APPLICATIONS

The present application is a continuation of International Application No. PCT/CN2020/089843, filed on May 12, 2020, which is based upon and claims priority to Chinese Patent Application No. 201910472514.X, filed on May 31, 2019 and entitled "INTERACTIVE INFORMATION NOTIFICATION METHOD, APPARATUS AND DEVICE, AND COMPUTER READABLE STORAGE MEDIUM", the entire contents of which are incorporated herein by reference in their entireties.

FIELD

The present disclosure relates to the field of communications, and particularly relates to an interactive information notification method and apparatus, a device, and a computer-readable storage medium.

BACKGROUND

With the development of networks, online spreadsheets have gradually entered users' lives. Online spreadsheets store spreadsheet data in a cloud server, are in data interaction with the cloud server through network communication, and display spreadsheet contents through a display interface.

In general, online spreadsheets support multiple users to perform editing operation and interaction operation on the spreadsheets at the same time. When interactive operations generate interactive information, in order to enable relevant personnel to handle with the interactive information in the online spreadsheet timely, a notification entry can be provided in a preset region of the currently edited online spreadsheet, or prompting information can be sent to the relevant personnel through a notification center.

However, after the above method is used to send the prompting information to a user, if the user wants to handle with the online spreadsheet according to the prompting information, the user needs to look up the interactive information in the online spreadsheet by himself. Therefore, it is time-consuming and labor-intensive. The user's handling efficiency for the spreadsheet is low.

SUMMARY

The present disclosure provides an interactive information notification method and apparatus, a device, and a computer-readable storage medium, used to solve the technical problem that the existing interactive information notification method requires users to find the position of the interactive information in the table by themselves, which is time-consuming and labor-intensive.

The first aspect of this disclosure is to provide an interactive information notification method, comprising:

receiving an interactive information viewing instruction sent by a first user, wherein the viewing instruction comprises position information of the interactive information in an online spreadsheet;

acquiring the interactive information from the online spreadsheet according to the position information; and displaying the interactive information in a highlighted manner in the online spreadsheet so that the interactive information is distinguished from other information in the online spreadsheet.

Another aspect of the present disclosure is to provide an interactive information notification apparatus, comprising:

a viewing instruction receiving module, configured to receive an interactive information viewing instruction sent by a first user, wherein the viewing instruction comprises position information of the interactive information in an online spreadsheet;

an interactive information acquisition module, configured to acquire the interactive information from the online spreadsheet according to the position information; and a display module, configured to display the interactive information in a highlighted manner in the online spreadsheet so that the interactive information is distinguished from other information in the online spreadsheet.

Another aspect of the present disclosure is to provide an interactive information reminder device, comprising a memory and a processor, the memory is configured to store instructions executable by the processor, and wherein the processor is configured to execute the interactive information notification method above.

Another aspect of the present disclosure is to provide a computer-readable storage medium, wherein the computer-readable storage medium stores a computer-executable instruction; and the computer-executable instruction, when executed by a processor, is configured to implement the interactive information notification method above.

According to the interactive information notification method and apparatus. the device, and the computer-readable storage medium which are provided by the present disclosure, after a viewing instruction sent by a first user and including position information of interactive information in an online spreadsheet is received, the interactive information is acquired from the online spreadsheet according to the position information, and the interactive information is displayed in a highlighted manner so that the interactive information is distinguished from other information in the online spreadsheet. Therefore, the user can quickly and intuitively determine the position of the interactive information, so as to correspondingly process the interactive information and improve the user's editing efficiency for the online spreadsheet.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are for some embodiments of the present disclosure, for those of ordinary skill in the art, other drawings may be obtained based on these drawings.

DETAILED DESCRIPTION OF THE EMBODIMENTS

In order to make the purpose, technical solutions and advantages of the embodiments of the present disclosure clearer, the technical solutions in the embodiments of the present disclosure will be described clearly and completely with reference to the accompanying drawings in the embodiments of the present disclosure. Obviously, the described embodiments It is a part of the embodiments of the present disclosure, but not all of the embodiments. All other embodiments obtained based on the embodiments in the present disclosure fall within the protection scope of the present disclosure.

In order to solve the technical problem that the existing interactive information notification method requires users to find the position of the interactive information in the table by themselves, which is time-consuming and labor-intensive, the present disclosure provides an interactive information notification method, device, equipment and computer-readable storage medium.

It should be noted that the interactive information notification method, device, device, and computer-readable storage medium provided in the present disclosure can be applied in any scenario where interactive information is reminded.

Figure 1:
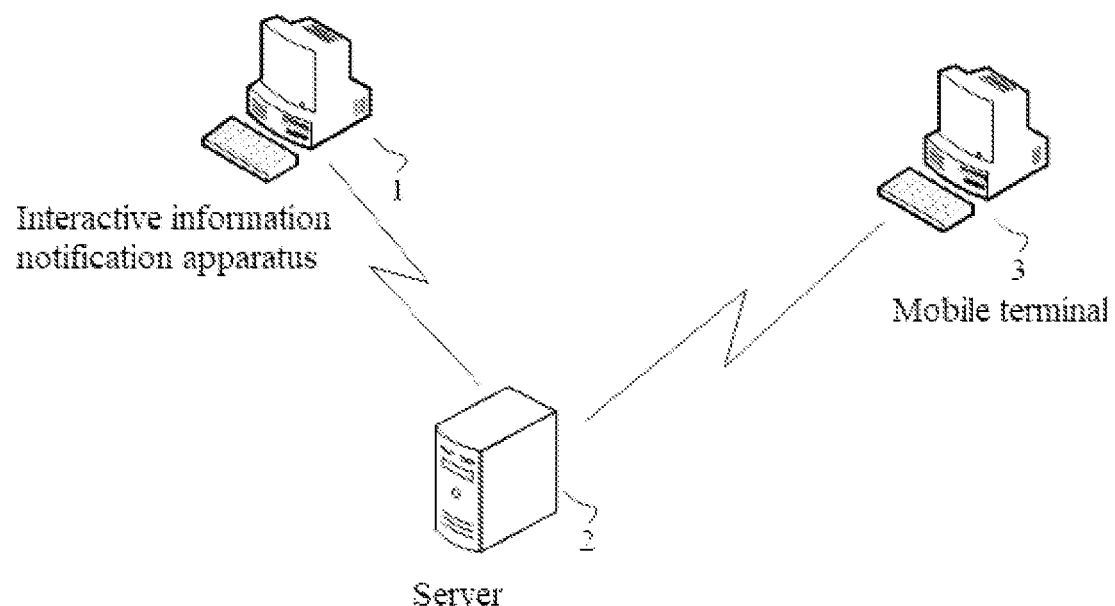
FIG. 1 is a schematic diagram of a network architecture on which the present disclosure is based.

FIG. 1 is a schematic diagram of the network architecture based on the present disclosure. As shown in FIG. 1, the network architecture on which the present disclosure is based at least includes: an interactive information notification device 1, a server 2 and a mobile terminal 3, wherein the server 2 is respectively connected to the interactive information notification device 1 and The mobile terminal 3 is connected in communication to realize information exchange. Among them, the interactive information notification device 1 can be written in languages such as C/C++, Java, Shell, or Python; the mobile terminal 3 can be, for example, a desktop computer, a tablet computer, and the like.

Figure 2:
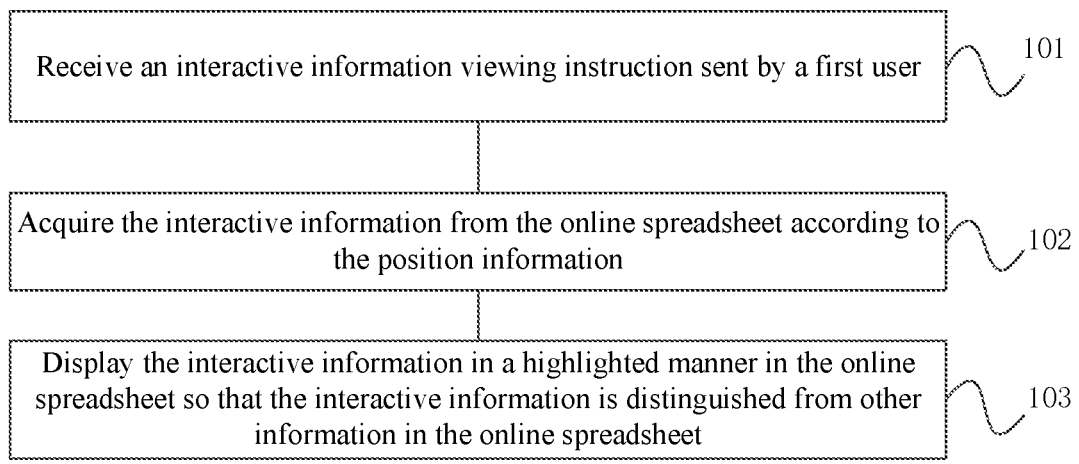
FIG. 2 is a flow diagram of an interactive information notification method provided by Embodiment 1 of the present disclosure.

FIG. 2 is a flow diagram of an interactive information notification method provided by Embodiment 1 of the present disclosure. As shown in FIG. 1, the method includes:

Step 101, an interactive information viewing instruction sent by a first user is received. The viewing instruction includes position information of the interactive information in an online spreadsheet.

An executive subject of the embodiments of the present disclosure is an interactive information prompting apparatus. The interactive information prompting apparatus may be arranged in a mobile terminal of the first user. The online spreadsheet supports a plurality of users to perform editing operation and interaction operation on the spreadsheet at the same time. The interaction operation may include reminding other users by means of a preset symbol in a cell in the online spreadsheet and/or a comment and remark corresponding to the cell, wherein the preset symbol may be @. A second user can prompt the first user in the online spreadsheet. After receiving the prompting information, the first user determines that it is currently prompted in the online spreadsheet by other second users. Therefore, the interactive information in the online spreadsheet can be viewed. Specifically, the interactive information viewing instruction can be sent to the interactive information prompting apparatus, wherein the viewing instruction includes position information of the interactive information in the online spreadsheet. Correspondingly, the interactive information prompting apparatus can receive the viewing instruction including the position information of the interactive information in the online spreadsheet.

Step 102, the interactive information is acquired from the online spreadsheet according to the position information.

In this implementation mode, in order to enable a user to locate the interactive information in the online spreadsheet as soon as possible, the interactive information prompting apparatus may acquire the interactive information from the online spreadsheet according to the position information in the viewing instruction after receiving the viewing instruction. Wherein, the position information may be specific row and column information in the online spreadsheet.

Step 103, the interactive information is displayed in a highlighted manner in the online spreadsheet so that the interactive information is distinguished from other information in the online spreadsheet.

In this implementation mode, in order to enable the first user to determine the position of the current interactive information more intuitively, after the interactive information is acquired from the online spreadsheet according to the position information, the interactive information can be displayed in a highlighted manner so that the interactive information can be distinguished from other information in the online spreadsheet. Therefore, the user can determine the position of the interactive information while opening the online spreadsheet. Specifically, the interactive information can be displayed in a distinguished manner in any manner, such as highlighted display, scrolling display, and bold display, which is not limited here in the present disclosure.

According to the interactive information prompting method provided by the embodiments of the present disclosure, after the viewing instruction sent by the first user and including the position information of the interactive information in the online spreadsheet is received, the interactive information is acquired from the online spreadsheet according to the position information, and the interactive information is displayed in a highlighted manner so that the interactive information is distinguished from other information in the online spreadsheet. Therefore, the user can quickly and intuitively determine the position of the interactive information, so as to correspondingly process the interactive information and improve the user's editing efficiency for the online spreadsheet.

Figure 3:
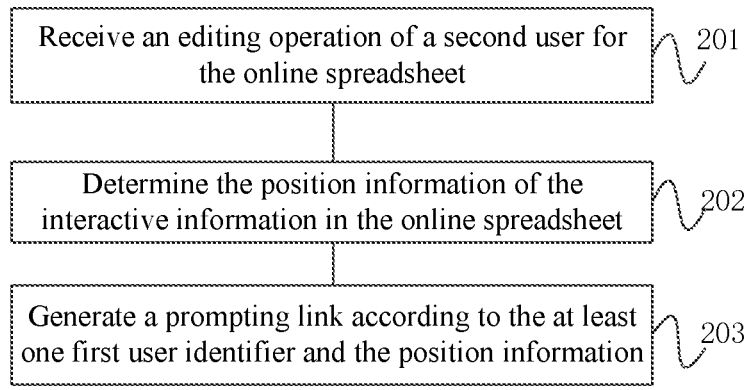
FIG. 3 is a flow diagram of an interactive information notification method provided by Embodiment 2 of the present disclosure.

FIG. 3 is a flow diagram of an interactive information notification method provided by Embodiment 2 of the present disclosure. On the basis of any one of the above-mentioned embodiments, as shown in FIG. 3, before the interactive information viewing instruction sent by the first user is received, the method further includes:

Step 201, an editing operation of a second user for the online spreadsheet is received. The editing operation is used for adding interactive information for prompting the first user in the online spreadsheet, and the interactive information includes at least one first user identifier.

Step 202, position information of the interactive information in the online spreadsheet is determined.

Step 203, a prompting link is generated according to the at least one first user identifier and the position information.

In the embodiments of the present disclosure, the second user can edit the online spreadsheet. In the editing process, there may be partial content related to other first users. Therefore, the related first users need to be prompted. At this time, the first users can be prompted by means of a preset symbol in a cell of the online spreadsheet or a comment and remark. Correspondingly, the interactive information prompting apparatus may receive the editing operation of the second user for the online spreadsheet, wherein the editing operation is used for adding interactive information for prompting the first user in the online spreadsheet, and the interactive information includes at least one first user identifier. In order to realize fast positioning of the interactive information, after the interactive information is received, the position information of the interactive information in the online spreadsheet needs to be determined at first. Wherein, the position information may be expressed by row and column information occupied by the interactive information in the spreadsheet. After the position information of the interactive information is determined, the prompting link may be generated according to the position information and the at least one first user. The prompting link may be specifically a uniform resource locator (URL). After the prompting link is generated, the prompting link may be sent to the first user, and the first user may click this prompting link to view the interactive information.

According to the interactive information prompting method provided by the embodiments of the present disclosure, the at least one first user identifier and the position information in the interactive information are acquired according to the editing operation of the second user, and the prompting link is generated according to the at least one first user identifier and the position information. Therefore, the user can quickly and intuitively determine the position of the interactive information.

Further, in order to enable the first user to locate the interactive information as soon as possible, before the prompting link is generated according to the at least one first user identifier and the position information, the method further includes:

Spreadsheet information of the online spreadsheet is acquired. The spreadsheet information includes a spreadsheet identifier and a spreadsheet storage path.

Generating the prompting link according to the at least one first user identifier and the position information includes:

the prompting link is generated according to the at least one first user identifier, the spreadsheet information, and the position information.

In the embodiments of the present disclosure, the first user may click the prompting link to view the interactive information. Therefore, in order to enable the user to locate the interactive information as soon as possible, before the prompting link is generated, the spreadsheet information of the online spreadsheet currently being edited by the second user also needs to be acquired, wherein the spreadsheet information includes the spreadsheet identifier of the online spreadsheet and the storage path of the online spreadsheet. Corresponding, the prompting link may be generated according to the spreadsheet information, the at least one first user identifier, and the position information. Since the prompting link includes the spreadsheet storage path, the first user can acquire and open this online spreadsheet after clicking the prompting link. Since the prompting link includes the position information of the interactive information, the interactive information can be directly acquired from the online spreadsheet according to the position information and displayed.

Further, in order to enable the first user to learn about the interactive information more intuitively, after the prompting link is generated, the user can also be prompted by means of a copy. An actual application is taken as an example, if Zhang San prompts Li Si by means of a preset symbol @ in the online spreadsheet, the prompting link may be generated according to the position of the interactive information, the spreadsheet information, and an identifier of Li Si and sent to Li Si. Correspondingly, after Li Si receives the prompting link, this prompting link and the copy may be seen on a display interface: Zhang San @ you in the [the spreadsheet identifier] spreadsheet. Li Si may view the interactive information by means of clicking the prompting link.

According to the interactive information prompting method provided by the embodiments of the present disclosure, by means of acquiring the spreadsheet information and adding the spreadsheet information in the prompting link, the first user may open the online spreadsheet by clicking this prompting link and quickly locate the interactive information, thus improving the online spreadsheet processing efficiency.

Further, on the basis of any one of the above embodiments, generating the prompting link according to the at least one first user identifier, the spreadsheet information, and the position information includes:

the at least one first user identifier, the spreadsheet information, and the position information are sent to a server so that the server generates the prompting link according to the at least one first user identifier and the position information and sends the prompting link to a mobile terminal of the at least one first user.

In the embodiments of the present disclosure, the interactive information prompting apparatus may be in communication connection with the server to realize information interaction. Therefore, the interactive information prompting apparatus may send the at least one first user identifier, the spreadsheet information, and the position information to the server so that the server can generate the prompting link according to the at least one first user identifier, the spreadsheet information, and the position information. In addition, the server also establishes communication connection with the mobile terminal of the first user so that the server may send the prompting link to the mobile terminal of the first user after generating the prompting link. Therefore, the first user may view and process the prompting link on the mobile terminal in time.

According to the interactive information prompting method provided by the embodiments of the present disclosure, the at least one first user identifier, the spreadsheet information, and the position information are sent to a server so that the server generates the prompting link according to the at least one first user identifier and the position information and sends the prompting link to the mobile terminal of the at least one first user. Therefore, the user can learn about the interactive information in time.

Further, on the basis of any one of the above embodiments, receiving the editing operation of the second user for the online spreadsheet includes:

an editing operation of the second user for any cell in the online spreadsheet and/or a preset region corresponding to the cell is received.

In the embodiments of the present disclosure, the online spreadsheet includes a plurality of cells. The user can perform operations, such as inputting and deleting, on data in the cells. In addition, the user can further perform comments or remarks operation on the data in any cell. Comments and remarks respectively have a preset region.

The preset region and the commented and/or remarked cell have an association relationship. Therefore, the interactive information input by the user in the preset region may be acquired by means of locating the cell. The second user can perform the editing operation in the cell and/or comments and/or remarks and input the interactive information. Correspondingly, the interactive information prompting apparatus can receive the editing operation of the second user for any cell in the online spreadsheet and/or the preset region corresponding to the cell.

According to the interactive information prompting method provided by the embodiments of the present disclosure, by means of receiving the editing operation of the second user for any cell in the online spreadsheet and/or the preset region corresponding to the cell, large-range interactive information inputting can be provided, and the applicability is relatively high.

Figure 4:
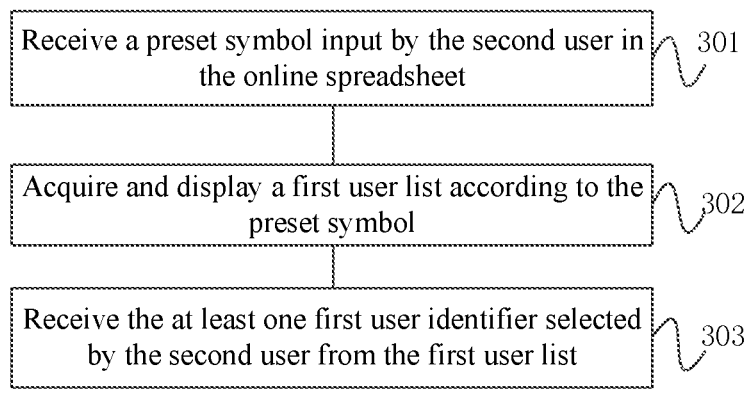
FIG. 4 is a flow diagram of an interactive information prompting method provided by Embodiment 3 of the present disclosure.

FIG. 4 is a flow diagram of an interactive information prompting method provided by Embodiment 3 of the present disclosure. On the basis of any one of the above embodiments, receiving the editing operation of the second user for the online spreadsheet includes:

Step 301, a preset symbol input by the second user in the online spreadsheet is received.

Step 302, a first user list is acquired and displayed according to the preset symbol.

Step 303, the at least one first user identifier selected by the second user from the first user list is received.

In the embodiments of the present disclosure, the second user can perform the editing operation on the online spreadsheet and input the interactive information. Specifically, the interactive information prompting apparatus can receive the preset symbol input by the second user, wherein the preset symbol may be @, and the first user list is acquired and displayed according to the preset symbol. The first user list includes all first user identifiers that can be prompted at present. The second user can select a first user that needs to be currently prompted from the first user list. The interactive information prompting apparatus can receive the at least one first user identifier selected by the second user from the first user list to realize the editing operation.

An actual application is taken as an example, Zhang San wants to prompt Li Si in the online spreadsheet. At this time, Zhang San can input the symbol @ in the currently selected cell. At this time, the first user list may be acquired according to this operation and shown to Zhang San. Zhang San can select the identifier of Li Si from the first user list to prompt Li Si.

According to the interactive information prompting method provided by the embodiments of the present disclosure, the first user list is acquired and displayed according to the editing operation of the second user so that the second user makes a selection. Therefore, the second user can quickly finish the editing operation, so as to further improve the editing efficiency of the online spreadsheet.

Further, on the basis of any one of the above embodiments, receiving the interactive information viewing instruction sent by the first user includes:

The interactive information viewing instruction sent by the first user by means of triggering the prompting link on the mobile terminal is received.

In the embodiments of the present disclosure, the server is in communication connection with the interactive information notification apparatus and the mobile terminal to realize information interaction. After the interactive information notification apparatus sends the at least one first user identifier, the spreadsheet information, and the position information to the server, the server can generate the prompting link according to the at least one first user identifier, the spreadsheet information, and the position information. After generating the prompting link, the server sends the prompting link to the mobile terminal of the first user, so that the first user can view and process the prompting link on the mobile terminal in time. Correspondingly, the interactive information notification apparatus can receive the interactive information viewing instruction sent by the user by means of triggering the prompting link on the mobile terminal.

According to the interactive information prompting method provided by the embodiments of the present disclosure, locating and displaying of the interactive information is realized by receiving the interactive information viewing instruction sent by the first user by means of triggering the prompting link on the mobile terminal.

Figure 5:
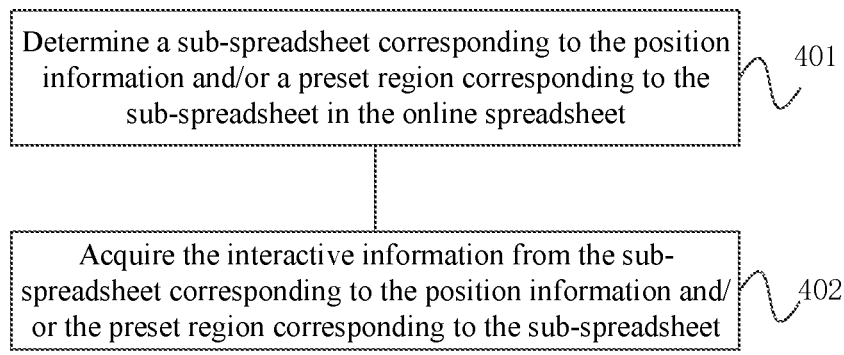
FIG. 5 is a flow diagram of an interactive information prompting method provided by Embodiment 4 of the present disclosure.

FIG. 5 is a flow diagram of an interactive information prompting method provided by Embodiment 4 of the present disclosure. On the basis of any one of the above embodiments, acquiring the interactive information from the online spreadsheet according to the position information includes:

Step 401, a sub-spreadsheet corresponding to the position information and/or a preset region corresponding to the sub-spreadsheet in the online spreadsheet is determined.

Step 402, the interactive information is acquired from the sub-spreadsheet corresponding to the position information and/or the preset region corresponding to the sub-spreadsheet is acquired.

In the embodiments of the present disclosure, after the viewing instruction sent by the first user is received, the position of the interactive information in the online spreadsheet needs to be determined. Specifically, since the viewing instruction includes the position information, the sub-spreadsheet corresponding to the position information and/or the region corresponding to the sub-spreadsheet in the online spreadsheet can be determined, the interactive information is acquired from the sub-spreadsheet corresponding to the position information and/or the preset region corresponding to the sub-spreadsheet, and the interactive information is shown to the first user in a distinguished manner so that the first user can process the interactive information in time.

According to the interactive information prompting method provided by the embodiments of the present disclosure, by means of determining the sub-spreadsheet corresponding to the position information and/or the preset region corresponding to the sub-spreadsheet in the online spreadsheet and acquiring the interactive information from the sub-spreadsheet corresponding to the position information and/or the preset region corresponding to the sub-spreadsheet, the interactive information can be quickly acquired, and the processing efficiency of the online spreadsheet is further improved.

Further, on the basis of any one of the above embodiments, acquiring the interactive information from the online spreadsheet according to the position information includes:

the sub-spreadsheet corresponding to the position information and/or the preset region corresponding to the sub-spreadsheet in the online spreadsheet is determined;

a preset range around the sub-spreadsheet corresponding to the position information and/or the preset region corresponding to the sub-spreadsheet is taken as a search region; and the interactive information is acquired from the search region.

In the embodiments of the present disclosure, if the second user prompts the first user in the online spreadsheet, but the first user does not open this prompting link within the preset time, it possibly causes that the position of the cell including the interactive information changes. Therefore, the position information of the interactive information during the generation of the prompting link possibly changes, and the interactive information cannot be accurately found according to the position information. At this time, the sub-spreadsheet corresponding to the position information and/or the preset region corresponding to the sub-spreadsheet in the online spreadsheet can be determined, and the preset range around the sub-spreadsheet corresponding to the position information and/or the preset region corresponding to the sub-spreadsheet is taken as the search region, so that the interactive information is acquired from the search region.

According to the interactive information prompting method provided by the embodiments of the present disclosure, by means of determining the sub-spreadsheet corresponding to the position information and/or the preset region corresponding to the sub-spreadsheet in the online spreadsheet and taking the preset range around the sub-spreadsheet corresponding to the position information and/or the preset region corresponding to the sub-spreadsheet as the search region, the interactive information is acquired from the search region, so that the problem that the interactive information cannot be located due to the change of the position of the cell can be avoided.

Further, on the basis of any one of the above embodiments, after the preset range around the sub-spreadsheet corresponding to the position information and/or the preset region corresponding to the sub-spreadsheet is taken as the search region, the method further includes:

if the interactive information does not exist in the search region, an inquiry fail prompt is sent to the first user.

In the embodiments of the present disclosure, if the second user prompts the first user in the online spreadsheet, but the first user does not open this prompting link within the preset time, in the process of editing the online spreadsheet, the second user will possibly delete the interactive information. At this time, the interactive information cannot be found according to the prompting link. Specifically, after the preset range around the sub-spreadsheet corresponding to the position information and/or the preset region corresponding to the sub-spreadsheet is taken as the search region, if no interactive information exists in the search region, an inquiry fail prompt may be sent to the first user so that the first user learns about the state of the interactive information in time.

According to the interactive information prompting method provided by the embodiments of the present disclosure, if the interactive information does not exist in the search region, the inquiry fail prompt is sent to the first user, so that the first user can learn about the state of the interactive information in time, and the user experience is improved.

Further, on the basis of any one of the above embodiments, displaying the interactive information in the highlighted manner in the online spreadsheet includes:

the interactive information is highlighted in the online spreadsheet.

In the embodiments of the present disclosure, in order to enable the first user to determine the position of the current interactive information more intuitively, after the interactive information is acquired from the online spreadsheet according to the position information, the interactive information can be displayed in the highlighted manner so that the interactive information can be distinguished from other information in the online spreadsheet. Therefore, the user can determine the position of the interactive information while opening the online spreadsheet. Specifically, the interactive information can be highlighted in the online spreadsheet.

According to the interactive information prompting method provided by the embodiments of the present disclosure, the interactive information is highlighted in the online spreadsheet, so that the first user can determine the position of the current interactive information more intuitively.

Figure 6:
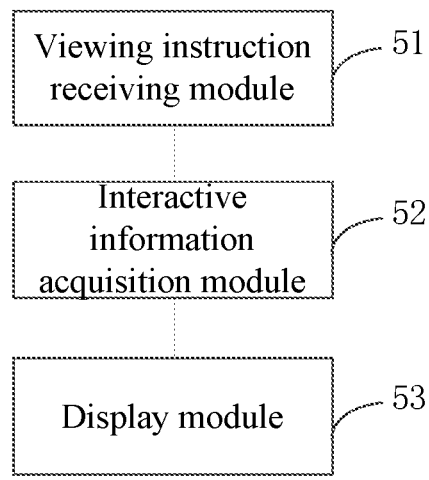
FIG. 6 is a schematic structural diagram of an interactive information prompting apparatus provided by Embodiment 5 of the present disclosure.

FIG. 6 is a schematic structural diagram of an interactive information prompting apparatus provided by Embodiment 5 of the present disclosure. As shown in FIG. 6, the apparatus includes:

a viewing instruction receiving module 51, configured to receive an interactive information viewing instruction sent by a first user, wherein the viewing instruction includes position information of the interactive information in an online spreadsheet;

an interactive information acquisition module 52, configured to acquire the interactive information from the online spreadsheet according to the position information; and a display module 53, configured to display the interactive information in a highlighted manner in the online spreadsheet so that the interactive information is distinguished from other information in the online spreadsheet.

According to the interactive information prompting apparatus provided by the embodiments of the present disclosure, after the viewing instruction sent by the first user and including the position information of the interactive information in the online spreadsheet is received, the interactive information is acquired from the online spreadsheet according to the position information, and the interactive information is displayed in the highlighted manner so that the interactive information is distinguished from other information in the online spreadsheet. Therefore, the user can quickly and intuitively determine the position of the interactive information, so as to correspondingly process the interactive information and improve the user's editing efficiency for the online spreadsheet.

Further, on the basis of any one of the above embodiments, the apparatus further includes:

an editing operation receiving module, configured to receive an editing operation of a second user for the online spreadsheet, wherein the editing operation is used for adding interactive information for prompting the first user in the online spreadsheet, and the interactive information includes at least one first user identifier;

a position information determination module, configured to determine the position information of the interactive information in the online spreadsheet; and a prompting link generation module, configured to generate a prompting link according to the at least one first user identifier and the position information.

Further, on the basis of any one of the above embodiments, the editing operation receiving module includes:

a first editing operation receiving unit, configured to receive an editing operation of the second user for any cell in the online spreadsheet and/or a preset region corresponding to the cell.

Further, on the basis of any one of the above embodiments, the editing operation receiving module includes:

a second editing operation receiving unit, configured to receive a preset symbol input by the second user in the online spreadsheet;

a first display unit, configured to acquire and display a first user list according to the preset symbol; and a first user identifier receiving unit, configured to receive the at least one first user identifier selected by the second user from the first user list.

Further, on the basis of any one of the above embodiments, the apparatus further includes:

a spreadsheet information acquisition module, configured to acquire spreadsheet information of the online spreadsheet. The spreadsheet information includes a spreadsheet identifier and a spreadsheet storage path.

The prompting link generation module includes:

a first generation unit, configured to generate the prompting link according to the at least one first user identifier, the spreadsheet information, and the position information.

Further, on the basis of any one of the above embodiments, the prompting link generation module includes:

a second generation unit, configured to send the at least one first user identifier, the spreadsheet information, and the position information to a server so that the server generates the prompting link according to the at least one first user identifier and the position information and sends the prompting link to a mobile terminal of the at least one first user.

Further, on the basis of any one of the above embodiments, the viewing instruction receiving module includes:

a viewing instruction receiving unit, configured to receive the interactive information viewing instruction sent by the first user by means of triggering the prompting link on the mobile terminal.

Further, on the basis of any one of the above embodiments, the interactive information acquisition module includes:

a first position determination unit, configured to determine a sub-spreadsheet corresponding to the position information and/or a preset region corresponding to the sub-spreadsheet in the online spreadsheet; and a first interactive information acquisition unit, configured to acquire the interactive information from the sub-spreadsheet corresponding to the position information and/or the preset region corresponding to the sub-spreadsheet.

Further, on the basis of any one of the above embodiments, the interactive information acquisition module includes:

a first position determination unit, configured to determine a sub-spreadsheet corresponding to the position information and/or a preset region corresponding to the sub-spreadsheet in the online spreadsheet;

a search region determination unit, configured to take a preset range around the sub-spreadsheet corresponding to the position information and/or the preset region corresponding to the sub-spreadsheet as a search region; and a second interactive information acquisition unit, configured to acquire the interactive information from the search region.

Further, on the basis of any one of the above embodiments, the interactive information acquisition module further includes:

a prompting unit, configured to send an inquiry fail prompt to the first user if the interactive information does not exist in the search region.

Further, on the basis of any one of the above embodiments, the display module includes:

a second display unit, configured to highlight the interactive information in the online spreadsheet.

Further, on the basis of any one of the above embodiments, the prompting link is a URL.

Figure 7:
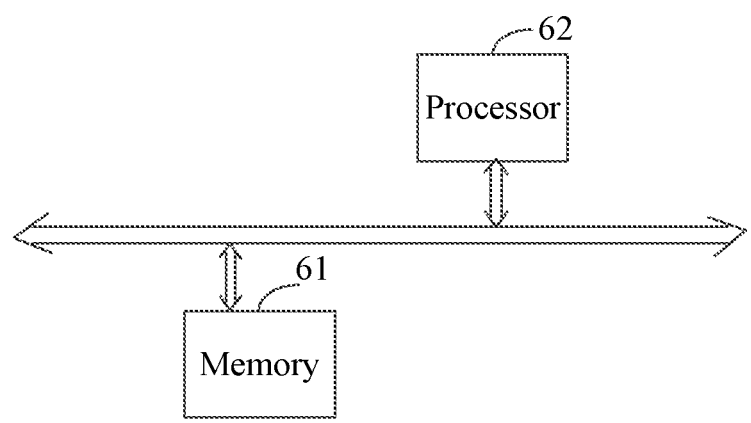
FIG. 7 is a schematic structural diagram of an interactive information prompting device provided by Embodiment 6 of the present disclosure.

FIG. 7 is a schematic structural diagram of an electronic device provided by Embodiment 6 of the present disclosure. As shown in FIG. 7, the electronic device includes a memory 61 and a processor 62.

The memory 61 is configured to store instructions executable by the processor 62.

Wherein, the processor 62 is configured to execute the interactive information prompting method as described in any one of the above embodiments.

Another embodiment of the present disclosure further provides a computer-readable storage medium. The computer-readable storage medium stores a computer-executable instruction that, when executed by a processor, is configured to implement the interactive information prompting method as described in any one of the above embodiments.

Those skilled in the art can clearly understand that, for the convenience and conciseness of the description, the specific working process of the device described above can refer to the corresponding process in the foregoing method embodiment, which will not be repeated here.

A person of ordinary skill in the art can understand that all or part of the steps in the foregoing method embodiments can be implemented by a program instructing relevant hardware. The aforementioned program can be stored in a computer readable storage medium. When the program is executed, it executes the steps including the foregoing method embodiments; and the foregoing storage medium includes: ROM, RAM, magnetic disk, or optical disk, and other media that can store program codes.

Finally, it should be noted that the above embodiments are only used to illustrate the technical solutions of the present disclosure, not to limit them; although the present disclosure has been described in detail with reference to the foregoing embodiments, those of ordinary skill in the art should understand that: The technical solutions recorded in the foregoing embodiments can still be modified, or some or all of the technical features can be equivalently replaced; and these modifications or replacements do not cause the essence of the corresponding technical solutions to deviate from the technical solutions of the embodiments of the present disclosure. Scope.

What is claimed is:

1. An interactive information notification method, comprising:

receiving an interactive information viewing instruction sent by a first user, wherein the viewing instruction comprises position information of the interactive information in an online spreadsheet;

acquiring the interactive information from the online spreadsheet according to the position information; and displaying the interactive information in a highlighted manner in the online spreadsheet so that the interactive information is distinguished from other information in the online spreadsheet, wherein acquiring the interactive information from the online spreadsheet according to the position information comprises:

determining a sub-spreadsheet corresponding to the position information and/or a preset region corresponding to the sub-spreadsheet in the online spreadsheet;

taking a preset range around the sub-spreadsheet corresponding to the position information and/or the preset region corresponding to the sub-spreadsheet as a search region; and acquiring the interactive information from the search region.

2. The method according to claim 1, wherein before receiving the interactive information viewing instruction sent by the first user, the method further comprises:
receiving an editing operation of a second user for the online spreadsheet, wherein the editing operation is used for adding interactive information for prompting the first user in the online spreadsheet, and the interactive information comprises at least one first user identifier;
determining position information of the interactive information in the online spreadsheet; and
generating a prompting link according to the at least one first user identifier and the position information.

3. The method according to claim 2, wherein receiving the editing operation of the second user for the online spreadsheet comprises:
receiving an editing operation of the second user for any cell in the online spreadsheet and/or a preset region corresponding to the cell.

4. The method according to claim 2, wherein receiving the editing operation of the second user for the online spreadsheet comprises:
receiving a preset symbol input by the second user in the online spreadsheet;
acquiring and displaying a first user list according to the preset symbol; and
receiving at least one first user identifier selected by the second user from the first user list.

5. The method according to claim 2, wherein before generating the prompting link according to the at least one first user identifier and the position information, the method further comprises:
acquiring spreadsheet information of the online spreadsheet, wherein the spreadsheet information comprises a spreadsheet identifier and a spreadsheet storage path;
generating the prompting link according to the at least one first user identifier and the position information comprises:
generating the prompting link according to the at least one first user identifier, the spreadsheet information, and the position information.

6. The method according to claim 5, wherein generating the prompting link according to the at least one first user identifier, the spreadsheet information, and the position information comprises:
sending the at least one first user identifier, the spreadsheet information, and the position information to a server so that the server generates the prompting link according to the at least one first user identifier and the position information and sends the prompting link to a mobile terminal of the at least one first user.

7. The method according to claim 2, wherein receiving the interactive information viewing instruction sent by the first user comprises:
receiving the interactive information viewing instruction sent by the first user by means of triggering the prompting link on the mobile terminal.

8. The method according to claim 2, wherein the prompting link is a uniform resource locator (URL).

9. The method according to claim 1, wherein acquiring the interactive information from the online spreadsheet according to the position information comprises:
determining a sub-spreadsheet corresponding to the position information and/or a preset region corresponding to the sub-spreadsheet in the online spreadsheet; and
acquiring the interactive information from the sub-spreadsheet corresponding to the position information and/or the preset region corresponding to the sub-spreadsheet.

10. The method according to claim 1, wherein displaying the interactive information in the highlighted manner in the online spreadsheet comprises:
highlighting the interactive information in the online spreadsheet.

11. An electronic device, comprising a memory and a processor, wherein
the memory is configured to store instructions executable by the processor, and
wherein the processor is configured to execute an interactive information notification method comprising:
receiving an interactive information viewing instruction sent by a first user, wherein the viewing instruction comprises position information of the interactive information in an online spreadsheet;
acquiring the interactive information from the online spreadsheet according to the position information; and
displaying the interactive information in a highlighted manner in the online spreadsheet so that the interactive information is distinguished from other information in the online spreadsheet,
wherein acquiring the interactive information from the online spreadsheet according to the position information comprises:
determining a sub-spreadsheet corresponding to the position information and/or a preset region corresponding to the sub-spreadsheet in the online spreadsheet;
taking a preset range around the sub-spreadsheet corresponding to the position information and/or the preset region corresponding to the sub-spreadsheet as a search region; and
acquiring the interactive information from the search region.

12. The electronic device according to claim 11, wherein acquiring the interactive information from the online spreadsheet according to the position information comprises:
determining a sub-spreadsheet corresponding to the position information and/or a preset region corresponding to the sub-spreadsheet in the online spreadsheet; and
acquiring the interactive information from the sub-spreadsheet corresponding to the position information and/or the preset region corresponding to the sub-spreadsheet.

13. A non-transitory computer-readable storage medium, wherein the computer-readable storage medium stores a computer-executable instruction; and
the computer-executable instruction, when executed by a processor, is configured to implement an interactive information notification method comprising:
receiving an interactive information viewing instruction sent by a first user, wherein the viewing instruction comprises position information of the interactive information in an online spreadsheet;
acquiring the interactive information from the online spreadsheet according to the position information; and
displaying the interactive information in a highlighted manner in the online spreadsheet so that the interactive information is distinguished from other information in the online spreadsheet,
wherein acquiring the interactive information from the online spreadsheet according to the position information comprises:
determining a sub-spreadsheet corresponding to the position information and/or a preset region corresponding to the sub-spreadsheet in the online spreadsheet;

taking a preset range around the sub-spreadsheet corresponding to the position information and/or the preset region corresponding to the sub-spreadsheet as a search region; and acquiring the interactive information from the search region.

14. The non-transitory computer-readable storage medium according to claim 13, wherein acquiring the interactive information from the online spreadsheet according to the position information comprises:

determining a sub-spreadsheet corresponding to the position information and/or a preset region corresponding to the sub-spreadsheet in the online spreadsheet; and acquiring the interactive information from the sub-spreadsheet corresponding to the position information and/or the preset region corresponding to the sub-spreadsheet.

\* \* \* \* \*